Dec. 15, 1931.  R. W. SEVERNS  1,836,511
TRAY
Filed April 10, 1929   2 Sheets-Sheet 1
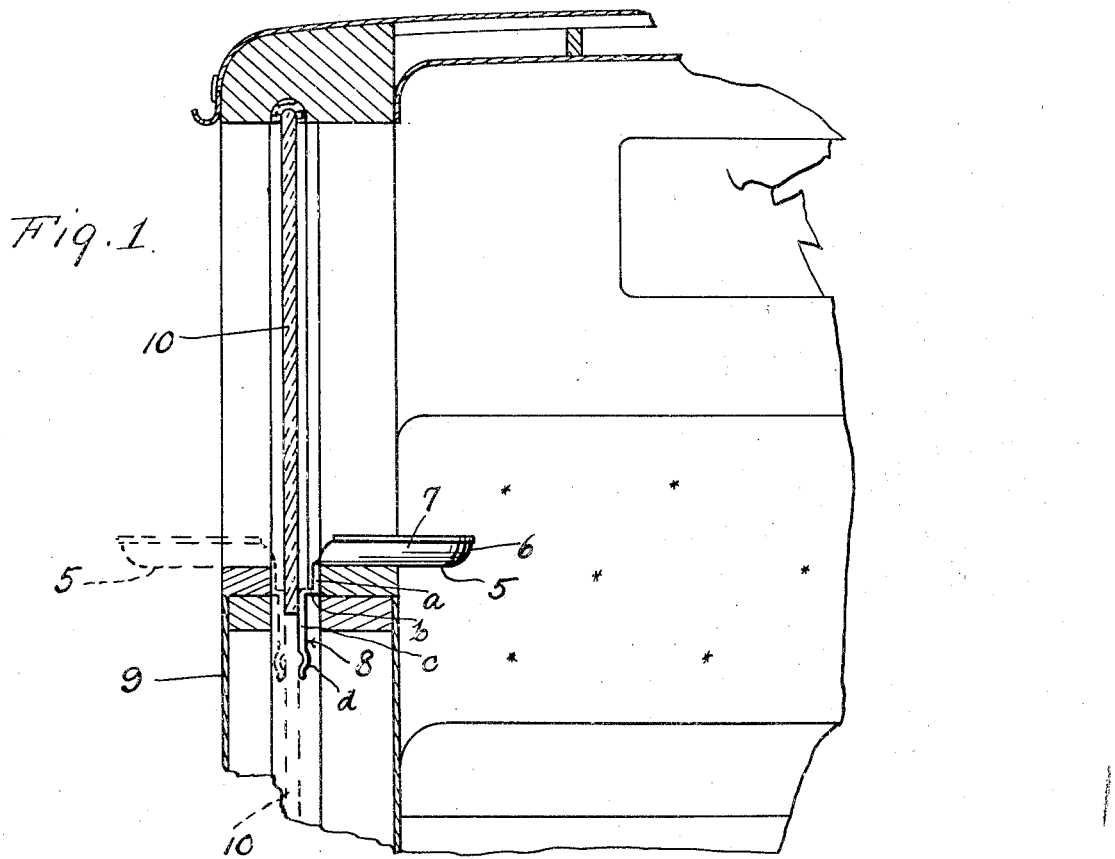
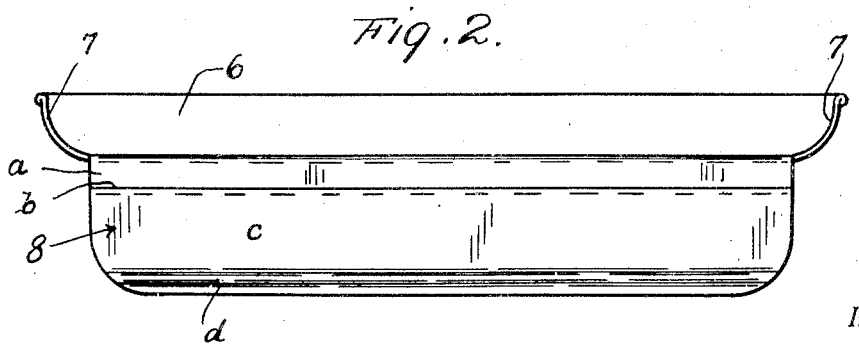
Inventor
R. W. Severns
By Clarence A. O'Brien
Attorney Dec. 15, 1931.  R. W. SEVERNS  1,836,511
TRAY
Filed April 10, 1929  2 Sheets-Sheet 2
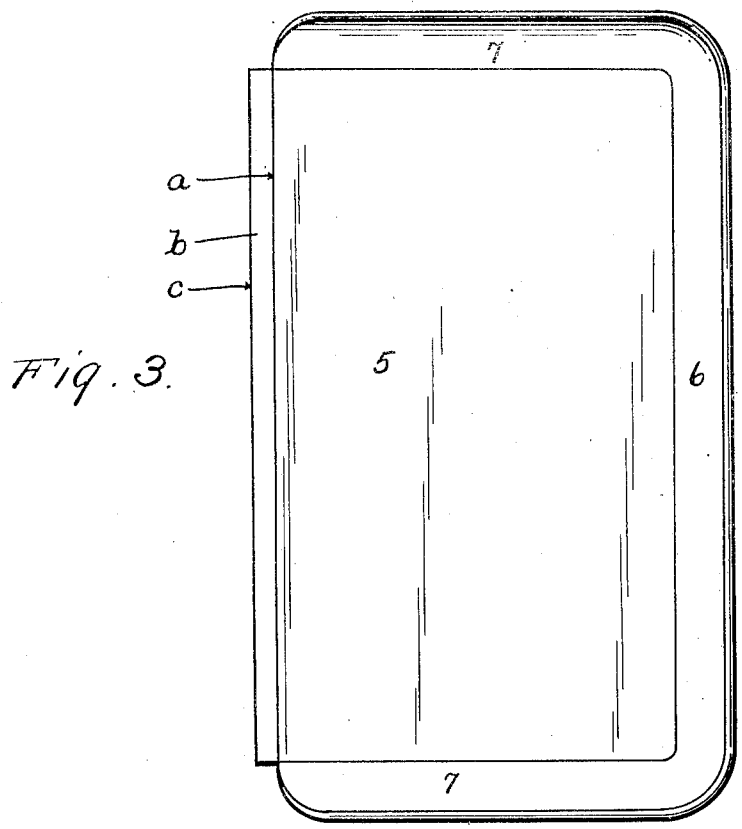
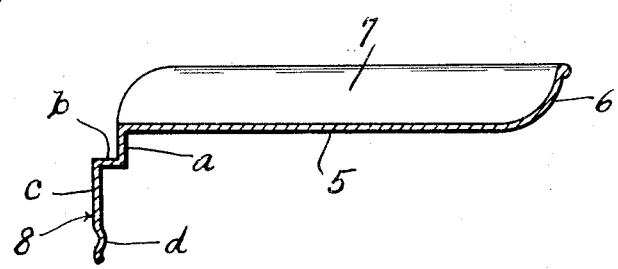
Inventor
*R. W. Severns*
By *Clarence A. O'Brien*
Attorney Patented Dec. 15, 1931

1,836,511

UNITED STATES PATENT OFFICE

RAY W. SEVERNS, OF LIMA, OHIO

TRAY

Application filed April 10, 1929. Serial No. 354,017.

The present invention relates to a tray and has for its prime object to provide a device of this nature particularly useful to occupants of an automobile.

Another very important object of the invention resides in the provision of a tray of this nature with means whereby the tray may be mounted on the door of the automobile so that occupants of the automobile may be served with food and drinks in a convenient manner.

Another very important object of the invention resides in the provision of a tray of this nature which is exceedingly simple in its construction, inexpensive to manufacture, strong and durable, thoroughly efficient and reliable in use, and otherwise well adapted to the purpose for which it is designed.

In the drawings:

Figure 1 is a sectional view through the door of a closed type automobile showing my improved tray mounted in place, Figure 2 is a side elevation of the tray, Figure 3 is a top plan view thereof, and Figure 4 is a transverse vertical section therethrough.

Referring to the drawings in detail it will be seen that the tray comprises a bottom 5 with an upturned side flange 6, and upturned end flanges 7. A downturned side flange denoted generally by the numeral 8 and the upper portion $a$ extends downwardly at right angles to the body 5 and merges into an outwardly directed right angular extension $b$ to form an offset depending portion $c$ which at its lower end is curved as indicated at $d$.

It will be seen in Figure 1 that the numeral 9 denotes the conventional type of door used on the closed car with the window 10 associated therewith. The tray may be rested on the inner or outer ledge of the door so that the flange exends down alongside the window whether raised or lowered thus holding the tray in place against accidental displacement.

The tray is shown inside the automobile in full line in Figure 1 while in dotted lines it is shown outside the door. Obviously with the tray mounted in either of the two positions indicated food, drinks and the like may be served to the occupants of the automobile in a very convenient manner.

It is thought that the construction, utility and advantages of this invention will now be quite apparent without a more detailed description thereof.

The present embodiment of the invention, of course, has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A service tray for automobile window ledges comprising a one-piece plate having a bottom, an upwardly curved flange at one side of the bottom, and upwardly curved flanges at its ends, said bottom having its opposite side portion angularly bent, forming a downturned flange, said bottom adapted to rest on the window ledge, and the downturned bent flange depending between and abutting against the glass window and the ledge.

In testimony whereof I affix my signature.

RAY W. SEVERNS.